(12) United States Patent
Rancien et al.

(10) Patent No.: US 8,963,778 B2
(45) Date of Patent: Feb. 24, 2015

(54) FIBROUS SUBSTRATE FOR INSERT INCLUDING AN ANTENNA

(75) Inventors: Sandrine Rancien, La Murette (FR); Celine Desnous, Voiron (FR)

(73) Assignee: Arjowiggins Security Integrale Solutions, Jouy sur Morin (FR)

( * ) Notice: Subject to any disclaimer, the term of this patent is extended or adjusted under 35 U.S.C. 154(b) by 707 days.

(21) Appl. No.: 12/666,227

(22) PCT Filed: Jul. 4, 2008

(86) PCT No.: PCT/FR2008/051249
§ 371 (c)(1),
(2), (4) Date: Feb. 22, 2010

(87) PCT Pub. No.: WO2009/007659
PCT Pub. Date: Jan. 15, 2009

(65) Prior Publication Data
US 2010/0321248 A1    Dec. 23, 2010

(30) Foreign Application Priority Data

Jul. 4, 2007 (FR) ..................... 07 56278

(51) Int. Cl.
*H01Q 1/38*    (2006.01)
(52) U.S. Cl.
USPC .................................. 343/700 MS
(58) Field of Classification Search
USPC .............. 343/700 MS; 428/453, 485, 48; 340/572.1, 571
See application file for complete search history.

(56) References Cited

U.S. PATENT DOCUMENTS

| | | | |
|---|---|---|---|
| 5,464,902 A * | 11/1995 | Recker | 525/119 |
| 5,890,409 A * | 4/1999 | Carlton et al. | 83/678 |
| 6,227,439 B1 * | 5/2001 | Hansen | 229/117.05 |
| 6,667,092 B1 * | 12/2003 | Brollier et al. | 428/182 |
| 6,975,830 B2 * | 12/2005 | Murakami et al. | 399/358 |
| 7,730,606 B2 * | 6/2010 | Forster et al. | 29/729 |
| 7,745,011 B2 * | 6/2010 | Cantu-Gonzalez | 428/453 |
| 7,948,382 B2 * | 5/2011 | Tuttle | 340/572.7 |
| 7,954,228 B2 * | 6/2011 | Kobayashi et al. | 29/600 |

(Continued)

FOREIGN PATENT DOCUMENTS

| | | |
|---|---|---|
| EP | 0 615 285 A2 | 9/1994 |
| EP | 1 236 650 A1 | 9/2002 |

(Continued)

OTHER PUBLICATIONS

"How corrugated cardboard is made" 2007.*

(Continued)

*Primary Examiner* — Huedung Mancuso
(74) *Attorney, Agent, or Firm* — Oliff PLC

(57) ABSTRACT

An assembly includes a wire antenna including at least on conductive turn, a first fibrous substrate on which the antenna extend. The first substrate comprises at least one coated paper including a fibrous base containing at least 30 mass % of natural fibers in the fibrous mass. The antenna is connected to a face of the flexible substrate. The paper includes on that face at least one surface layer containing at least one mineral load and a coating binder. The fibrous base may contain at least 40 mass %, preferably 50 mass %, more preferably 60 mass % and ideally at least 70 mass % of natural fibers, with preferably a lower proportion of long natural fibers relative to short ones when the fibrous mass includes synthetic fibers, in particular between 5 and 25% of synthetic fibers.

69 Claims, 2 Drawing Sheets

(56) References Cited

U.S. PATENT DOCUMENTS

Figure 1:
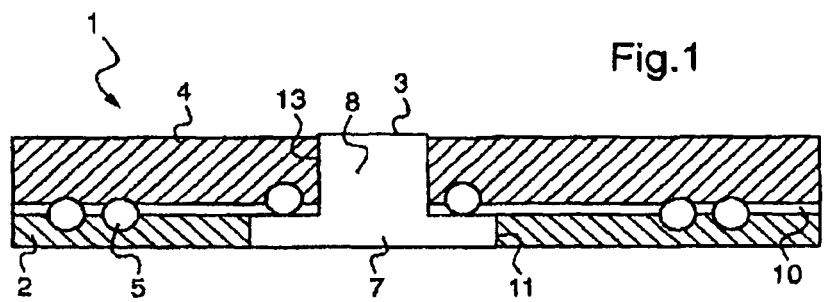

| | | | |
|---|---|---|---|
| 8,136,223 B2* | 3/2012 | Forster et al. | 29/600 |
| 2003/0121140 A1* | 7/2003 | Arx et al. | 29/611 |
| 2003/0164611 A1 | 9/2003 | Schneider et al. | |
| 2003/0168514 A1* | 9/2003 | Rancien et al. | 235/492 |
| 2003/0207992 A1* | 11/2003 | Mussig et al. | 525/55 |
| 2004/0154766 A1 | 8/2004 | Rancien et al. | |
| 2005/0060637 A1 | 3/2005 | Rietzler | |
| 2005/0212131 A1 | 9/2005 | Kawai | |
| 2006/0005050 A1 | 1/2006 | Basson et al. | |
| 2006/0043198 A1* | 3/2006 | Forster | 235/492 |
| 2006/0201571 A1* | 9/2006 | Stobbe | 139/426 R |
| 2007/0039694 A1* | 2/2007 | Walther et al. | 156/579 |
| 2007/0080804 A1* | 4/2007 | Hirahara et al. | 340/572.1 |
| 2007/0146765 A1 | 6/2007 | Matsuda et al. | |
| 2007/0152823 A1* | 7/2007 | Hirahara et al. | 340/572.1 |
| 2010/0090832 A1* | 4/2010 | Bozet et al. | 340/572.8 |

FOREIGN PATENT DOCUMENTS

| | | |
|---|---|---|
| EP | 1 284 320 A2 | 2/2003 |
| EP | 1 562 140 A2 | 8/2005 |
| UZ | 01967 | 9/1997 |
| WO | WO 96/28610 A1 | 9/1996 |
| WO | WO 01/03058 A1 | 1/2001 |
| WO | WO 02/02350 A1 | 1/2002 |
| WO | WO 2005/098748 A1 | 10/2005 |
| WO | WO 2006/000849 A1 | 1/2006 |
| WO | WO 2006/079904 A1 | 8/2006 |

OTHER PUBLICATIONS

"How are corrugated cardboard made?" 2001.*
"Containerboard 101—A comprehensive Overview" by Dave Hillman dated Jul./Aug. 2009.*
Written Opinion issued for International Application No. PCT/FR2008/051249 on Apr. 2, 2009 (with translation).
International Search Report issued for International Application No. PCT/FR2008/051249 on Apr. 2, 2009 (with translation).
Uzbekistani Office Action dated Jan. 30, 2013 from Uzbekistani Application No. 20100038 (with English-language translation).

* cited by examiner

FIBROUS SUBSTRATE FOR INSERT INCLUDING AN ANTENNA

The present invention relates to an insert with an RFID device comprising a wire antenna, intended to be for example integrated in a security document such as a passport or an identity card.

The sought features for an insert are the following.

As regards manufacturing, the wire antenna should be able to be firmly secured to a substrate of the insert via an adhesive layer, an ultrasonic sinking method or a thermal method.

Electronically, the insert should not perturb the efficiency of the RFID device which it comprises and should also be a good heat sink for the heat emitted by the operating RFID device. Finally, the RFID device should be protected from electrostatic discharges.

Mechanically, the insert should be relatively flat in order not to create significant overthickness and the insert should be sufficiently flexible so as to be compatible with the rigidity of the document into which it is integrated. The insert should mechanically protect the antenna and optionally the electronic component connected to the antenna from mechanical stresses of the impact, flexure or torsion type.

The insert should also chemically protect the antenna and optionally the electronic component from humidity in order to prevent any corrosion phenomenon.

The insert should be able to be sandwiched between two other substrates which are the cover and the flyleaf of the booklet in the case of a passport or two plastic films in the case of an identity card. In both cases, it is desirable that the insert have on its outer faces, sufficient high surface energy and sufficient absorption capacity in order to promote assembling by adhesively bonding the insert with other substrates. Indeed, any attempt to separate the insert from the document into which it is integrated should cause damage to the insert. For the application to an identity card, the insert should optionally be printable and customizable.

As regards security, the insert should be sufficiently cohesive and solid so as not to spontaneously delaminate in the thickness or to tear, this during the period of use of the security document into which it is integrated.

The insert should also be tamperproof in order to prevent any removal of the RFID device by a fraudster with view to using it in another document. Any attempt to tamper with the insert by dry peeling, at a temperature, in water or solvents should be impossible or be expressed by destruction of the insert and especially of the RFID device.

Application US 2005/0060637 discloses an insert for an identification document which comprises a multilayer structure with a substrate comprising in the core a chip and an antenna forming a transponder and two outer substrates in foamed plastic, both of the substrates sandwiching the substrate bearing the transponder. The latter consists of a thermoplastic material notably based on polyimide or derivative. The foamed plastic substrates are based on polyolefin and notably on silica-filled polyethylene. The substrate of the transponder and one of the outer substrates are provided with an aperture for partly housing the chip in thickness and limiting any overthickness.

Such an insert does not have all the sought properties listed above. Indeed, although the use of outer silica-filled polyethylene substrates for the insert is more favorable for attaching adhesives used for subsequent assembling in a security document than an insert in pure plastic, the insert after assembly between a passport cover and a flyleaf has the drawback of not providing completely satisfactory tamper resistance.

The separation of the insert from the passport cover by dry peeling is quite possible without causing damage to the insert, because the cohesive force of the insert is greater than the adherent force of the cover on the insert.

Application US 2006/0005050 describes an insert to be integrated into a passport, this insert having specific physical features in order to make any tampering attempt obvious, notably during peeling. This proof of tampering is provided by the presence of embrittlement areas on the chip and the use of an adhesive with resists for attaching the antenna. The insert is based on a material of the Teslin® or Artysin® type. However, the antenna is not integrated into the insert but is present at the surface of this insert. This antenna may optionally be covered with an adhesive layer which does not have the function of being a barrier to water. The antenna and its connection on the chip are therefore not protected from humidity related to external aggressions or to the use of cold aqueous adhesives during the subsequent assembly in the security documents.

Publication WO 2006/079904 discloses an insert for an identification document which comprises a two-layer structure with two paper layers, coated on their inner face with a plastic material, the RFID device being sandwiched after hot assembly between both plastic material layers. The plastic material coated on the inner face of both papers is a thermoplastic material such as polyethylene. Such an insert has the drawback of being able to be tampered with, notably by hot peeling. Indeed, both thermoplastic layers after hot assembly may again be softened or melted, thereby allowing removal of the device.

Application US 20050212131 discloses an insert for an identification document which comprises a multilayer structure including the RFID device. This type of insert has the drawback of not being planar and, consequently, is able to create visible overthickness after integration into a security document.

Application WO 2006000849 describes an insert which comprises a multilayer structure with at least two flexible layers and an inner flexible substrate with limited dimensions, on which a module and an antenna are positioned. This substrate and the RFID device are compensated in thickness by different intermediate layers. In order to make this insert tamperproof and notably to avoid that the RFID device may be removed by peeling the constitutive layers of the insert, it is proposed that holes be made facing each other in each of the constitutive layers of the insert except in the flexible outer layers, and that they be filled with an adhesive providing both chemical resistance and mechanical resistance, such as an epoxy, polyimide or UV-activatable adhesive. This publication also provides the use of plastic or metal rivets instead of the adhesive. The outer layers may consist of a material with a fibrous base or a plastic base. Such an insert is relatively complicated to make, because of the relatively high number of relevant layers and of the number of operations to be carried out.

The invention aims at proposing an insert for a security document which finds a remedy to the whole or part of the previous drawbacks and which is reliable and relatively simple to make.

The object of the invention according to one of its aspects, is an assembly including: a wire antenna including at least one conductive turn, a first fibrous substrate on which the antenna extends, this first substrate including a coated paper comprising a fibrous base formed with at least 30% by mass of natural bulk fibers, the antenna being firmly secured to the face of the flexible substrate, the paper including on this face at least one surface layer comprising at least one mineral filler and a coating binder.

The fibrous base may include at least 40%, better 50%, even better 60%, preferentially at least 70% by mass, of natural fibers, with for example a less high proportion of long natural fibers than short fibers, notably when the fibrous base includes a relatively high proportion of synthetic fibers.

According to another example, the fibrous base may include a less high proportion of short natural fibers than long natural fibers, for example 20% of the natural fibers are short and 80% of the natural fibers are long.

A high proportion of natural fibers has the advantage of providing a more cohesive fibrous base, although less stable dimensionally.

The fibrous base advantageously also includes synthetic fibers, preferably fibers of a thermoplastic material, notably of a polyamide, polyester, polyolefin, and/or a mixture of such fibers.

The fibrous base preferentially includes at most 70% of synthetic fibers and preferably between 5 and 25% of synthetic fibers, by mass, in the fibrous base.

The mass content of synthetic fibers in the fibrous base may be evaluated for example by a three-dimensional measurement by stereology on a two-dimensional cut with a scanning electron microscope.

Several sectional images may be acquired, in the running direction of the paper-making machine (MD) and in the cross-direction (CD).

The number of synthetic fibers intercepted by the cut for each image is counted for each paper direction, i.e. $N_{cd}$ and $N_{md}$). The average number of synthetic fibers in the paper is calculated by $N=(N_{cd} \cdot N_{md})^{1/2}$.

The counted total length L of paper is given by the sum of the length of the counted images.

The number of fibers per linear meter of paper is given by N/ml=N/L.

The fiber weight per $m^2$ is calculated by using the titer/density/linear mass (in dtex) and N/ml by means of the following formula:

$$SF\text{Weight}/m^2 = W = (\pi/2)*N/ml*\text{Titer}.$$

The rate of synthetic fibers is obtained by dividing this weight by the basis weight of the fibrous base. Preferably, the number of images is sufficient for counting at least 400 synthetic fibers, in order to reduce the inaccuracy of the method.

The natural fibers may be formed entirely or partly with cellulose fibers, notably be entirely cellulose fibers.

The fibrous base may include polyamide fibers, the polyimide fibers for example being the only synthetic fibers of the fibrous base. The average length of the synthetic fibers may be comprised between 3 and 10 mm, being for example greater than or equal to 4 mm. The average diameter of the synthetic fibers may be comprised between 0.9 and 4.2 dtex, for example between 0.9 and 3.3 dtex, better between 1.2 and 2 dtex, being for example equal to that of natural fibers to within ±30%.

The use of synthetic fibers in the fibrous base provides the following properties:
high tear and tensile strength,
flexibility,
dimensional stability, which avoids that too large dimensional variation of both substrates and especially of the substrate which receives the antenna, may cause unacceptable change in the operating frequencies of the RFID with which the antenna may be coupled or connected,
insertion of the antenna by ultrasound is easier because of the possibility of moving the synthetic fibers under the pressure of the antenna wire.

The first substrate may be free of fillers in the bulk of the fibrous base, which may improve the cohesion of the fibrous base.

The fibrous base of the first substrate may include a natural or synthetic binder. This binder of the fibrous base may advantageously be selected from thermoplastic polymers with a glass transition temperature $T_g$ of less than or equal to 20° C., better 10° C., in order to provide flexibility.

In an exemplary embodiment, the fibers of the fibrous base are bound with a bulk-precipitated binder, the binder of the fibrous base being for example selected from polymers with $T_g$ of less than or equal to −10° C., being for example selected from styrene-butadiene copolymers, acrylic polymers and vinyl acetates and their copolymers.

In another exemplary embodiment of the invention, the binder of the fibrous base is for example introduced into the fibrous base by surfacing, the binder of the fibrous base being for example selected from polymers with $T_g$ of less than or equal to +10° C., the binder of the fibrous base for example including a natural binder, notably starch, or a synthetic binder, notably polyvinyl alcohol or a styrene-acrylic polymer, for example with $T_g$ close to 7° C.

The binder of the fibrous base is optionally associated with a softener. The latter may be selected from glycerin, urea or urea nitrate.

The presence of a bulk or surface flexible binder in the flexible fibrous base and optionally of a softener provides the following properties:
flexibility,
internal cohesion in order to provide the insert with sufficient delamination strength,
a pore filling effect in order to maintain at the surface of the flexible substrate the surface layer based on coating binder and on fillers.

The fibrous base may either comprise mineral fillers or not. The presence of fillers in the fibrous base provides a gain in flexibility of the flexible substrate but may cause loss of internal cohesion. The presence of fillers may improve the dimensional stability of the substrate and may thereby improve the stability of the antenna during the hot lamination process of both substrates of the insert or during the final use of the insert depending on the external temperature and humidity conditions.

The filler in the fibrous base is preferably of a mineral kind, for example selected from carbonates, notably calcium carbonate, talc, kaolin, aluminosilicates, titanium dioxide and mixtures thereof. The fibrous base may include between 0 and 25%, for example 0 and 20%, by weight of mineral filler.

The coating binder advantageously includes a thermoplastic material, the amount of thermoplastic material being for example adjusted in order to obtain upon coating a concentration of less than or equal to 20 g/$m^2$ by dry mass, better less than or equal to 10 g/$m^2$ by dry mass, the coating binder of the surface layer may for example include a polymer or a copolymer of a styrene-butadiene, acrylic, styrene acrylic or vinyl kind.

The surface layer of at least one of the substrates may be based on a polymer or on a thermoplastic copolymer, and preferably on a flexible polymer dispersion with $T_g$<20° C. and on mineral fillers, preferably a mineral filler having a relatively high absorption capacity (oil absorption according to DIN EN ISO 787-5), i.e. greater than 30 mL/100 g.

The presence of a coating based on thermoplastic polymeric binder and on mineral fillers at least at the surface of the substrate on which the antenna is positioned allows insertion by sinking and easier adhesive bonding of the antenna by ultrasound.

A surface layer based on thermoplastic polymeric binder and on fillers has sufficient temperature behavior and rigidity in order to allow proper insertion of an antenna wire, i.e. good attachment of the antenna on/in the substrate for proper unrolling of the antenna, which may be quantified by a minimum peel-off force level, and a satisfactory level of penetration on the antenna into the substrate in order to limit local overthicknesses on the insert.

Fillers at the surface of the paper, preferably in a rate of use of less than 20 $g/m^2$ by dry mass, also improve the transmission of ultrasonic energy.

The coating based on thermoplastic polymer binder and on mineral fillers at least at the surface of the substrate on which the antenna is positioned provides surface energy and a higher absorption capacity of the substrate, which promotes spreading and penetration of an adhesive, and therefore subsequent adherence of the hot activatable adhesive, used in the process for assembling both flexible substrates of the insert but also in the subsequent assembling by cold or hot adhesive bonding of the insert with other materials, for example a cover or a flyleaf of a passport booklet, while providing satisfactory security in the case of an attempt to separate the assembly.

Absorbent fillers at the surface of the paper with an oil absorption level greater than 30 mL/100 g, such as for example silicas (for example with an absorption level of 200-300 mL/100 g), aluminium and sodium silicates (for example with an absorption level of 80 mL/100 g), alumina hydrates (absorption level of 30-55 mL/100 g), titanium dioxide and their mixtures promote spreading and penetration of the adhesive.

The face of the paper receiving the antenna may receive an adhesive, the adhesive may have natural tackiness or triggered for example by exposure to UV radiation or heat, after its deposition, the tackiness persisting e.g. for 60 seconds after its having been laid. The adhesive is for example deposited by spraying, printing, notably screen-printing, or by a needle or transfer system.

The adhesive may be hot cross-linkable or UV or EB (Electron Beam) cross-linkable, the adhesive may either include or not a cross-linking agent, the adhesive deriving for example from a urethane acrylate and including a cross-linking agent, the cross-linking agent for example being of the isocyanate type.

The adhesive may be deposited over a full width or only cover a portion of the face of the first flexible substrate, over a region extending under the antenna.

The assembly may include an RFID electronic component, for example a module connected to the antenna or electromagnetically coupled to the latter, the component may be housed at least particularly in a recess of the first substrate.

The object of the invention according to another of its aspects, is an insert including an assembly as defined above, including a second superposed fibrous substrate, adhered to the first, the antenna being located between both substrates.

The substrates may include two respective recesses at least partly superposed, in which an electronic component is positioned, for example an RFID module including an integrated circuit chip, this module for example having a widened base surmounted with a boss.

The component may be electrically connected to the ends of the antenna or electromagnetically coupled to the latter.

The holes may be through-holes.

The second substrate may be of a composition identical with the first, optionally being of a basis weight different from the first. The total thickness of the different superposed layers of the insert may be substantially equal to the thickness of the module.

The second substrate may include a for example hot activatable adhesive, i.e. exerting a hot adhesive function either in the presence of a cross-linking agent or not.

The second substrate may be hot cross-linkable, i.e. capable of forming a three-dimensional lattice, because of its nature, and/or the presence of a cross-linking agent.

The object of the invention according to another aspect is further a method for making an assembly as defined above, including the step consisting of depositing the antenna wire on the first substrate.

The method may include the step consisting of coating the first flexible substrate with an adhesive before laying the antenna wire thereon.

The attachment of the antenna wire on the first substrate may be accomplished by compression (notably in the case when the antenna is secured with the first substrate via an adhesive), thermocompression or by ultrasound.

This adhesive may have tackiness triggered by UV radiation. In this case, the method may for example include the step consisting of locally exposing the adhesive to UV radiation, for example at the same time or just before laying the wire antenna.

This adhesive may have tackiness triggered by heat.

Both substrates may be assembled by means of an adhesive based on a reactive polymer or copolymer, temperature-activatable, with or without pressure, this adhesive being sized as a fluid on one of the substrates.

The second substrate may also be coated with a hot-activatable reactive adhesive, for example a reactive polyurethane or a reactive acrylate.

The second substrate may be coated with an adhesive including a cross-linking agent, for example of the melamine, isocyanate or epoxy kind.

The first and/or second substrate may be coated with adhesive on-line, during the making of the substrate, for example by a device of the Twin HSM type.

Using for assembling both substrates, of an adhesive based on a one- or two-component reactive polymer, and preferably of an adhesive based on polyurethane or based on acrylate copolymer added with a cross-linking agent, for example of the epoxy, melamine or isocyanate kind, provides the following properties;
- increased mechanical strength making delamination of the insert more difficult under normal conditions of use,
- a barrier to humidity of the adhesive joint, in order to prevent corrosion phenomena,
- tamper resistance both by dry and hot (110° C.-130° C.) peeling, or after immersion in chemicals (water, solvent, etc.),
- flexibility of the insert so as not to excessively stiffen the security document.

The object of the invention is further a security document including an insert as defined above.

In an exemplary embodiment of the invention the first substrate comprises synthetic fibers in thermoplastic material, for example fibers of polyamide, polyester and/or polyolefin. The length and the diameter of these fibers may notably depend on the mechanical properties which one wishes to impart to the substrate. For example, in the case notably when it is desired that the substrate be resistant to tear, it may be useful to incorporate a certain proportion of polyamide fibers with a length comprised between 3 and 10 mm. Their diameter is for example close to that of wood and/or cotton fibers, used in the substrate, in order to promote flatness of the substrate, the diameter for example being comprised between 0.9 and 4.2 dtex, for example between 0.9 and 3.3 dtex, and for example close to 1.7 dtex (13.8 microns).

The fibers in thermoplastic material may be homogeneously dispersed in the fibrous layer. Such a substrate may include between 0 and 70% of synthetic fibers and preferably between 5 and 25%, may not have any bulk filler in the fibrous base or have some depending on the sought compromise between internal cohesion, rigidity and dimensional stability.

In an exemplary embodiment of the invention, the fibrous base of the first substrate is bound with a bulk-precipitated synthetic polymer of Tg<20° C. and for example with a flexible polymer with Tg of the order of −20° C., which may be precipitated in situ on the fibers according to known methods in the state of the art.

In another exemplary embodiment of the invention, the fibrous base of the first substrate is bound with a synthetic polymer with Tg<20° C. introduced by size press surfacing or by impregnation and for example with a flexible polymer with Tg of the order of 7° C., which provides both flexibility and low fouling of the size press or impregnator rolls. This binder may be associated with a softener such as urea nitrate for further increasing the flexibility of the flexible substrate.

In another exemplary embodiment of the invention, the fibrous base of the first support is bound with a hydrophilic natural binder such as polyvinyl alcohol or starch, introduced by size press surfacing or by impregnation. This binder may be added with a softener for example glycerin, in order to increase the flexibility of the flexible substrate.

In an exemplary embodiment of the invention, one of the substrates of the insert has at least on one of its faces a coating comprising thermoplastic bonder and mineral fillers. This binder may be selected from synthetic binders, including acrylic, vinyl, styrene-butadiene, styrene-butadiene-acrylonitrile polymers or copolymers.

In an exemplary embodiment of the invention, the adhesive which allows the antenna and the first substrate to be secured is based on a polymer. This adhesive is preferably selected so as to have naturally or under initiation of radiation for example UV radiation or heat, sufficient tackiness for maintaining the antenna upon its unrolling on the flexible substrate before assembly with the second substrate. This adhesive is preferably anhydrous and does not have any acidity so as not to induce any corrosion phenomenon of the wire of the antenna. The adhesive may for example be based on urethane acrylate or epoxy.

In an exemplary embodiment of the invention, the second substrate is coated over the whole of its surface with an adhesive in a hot activatable reactive polymer and notably at a temperature of the order of 140° C. This adhesive is preferably anhydrous and does not have any acidity so as not to induce any corrosion phenomenon of the wire of the antenna. The preferred adhesive is a reactive polyurethane or acopolymer of acrylate with a melamine resin.

The object of the invention according to another of its aspects is a method for making a security document including the step consisting of assembling an insert as defined above, with a booklet or at least one film, notably with a cold adhesive, in particular a vinyl or acrylic glue, or a hot-activatable adhesive.

Figure 2:
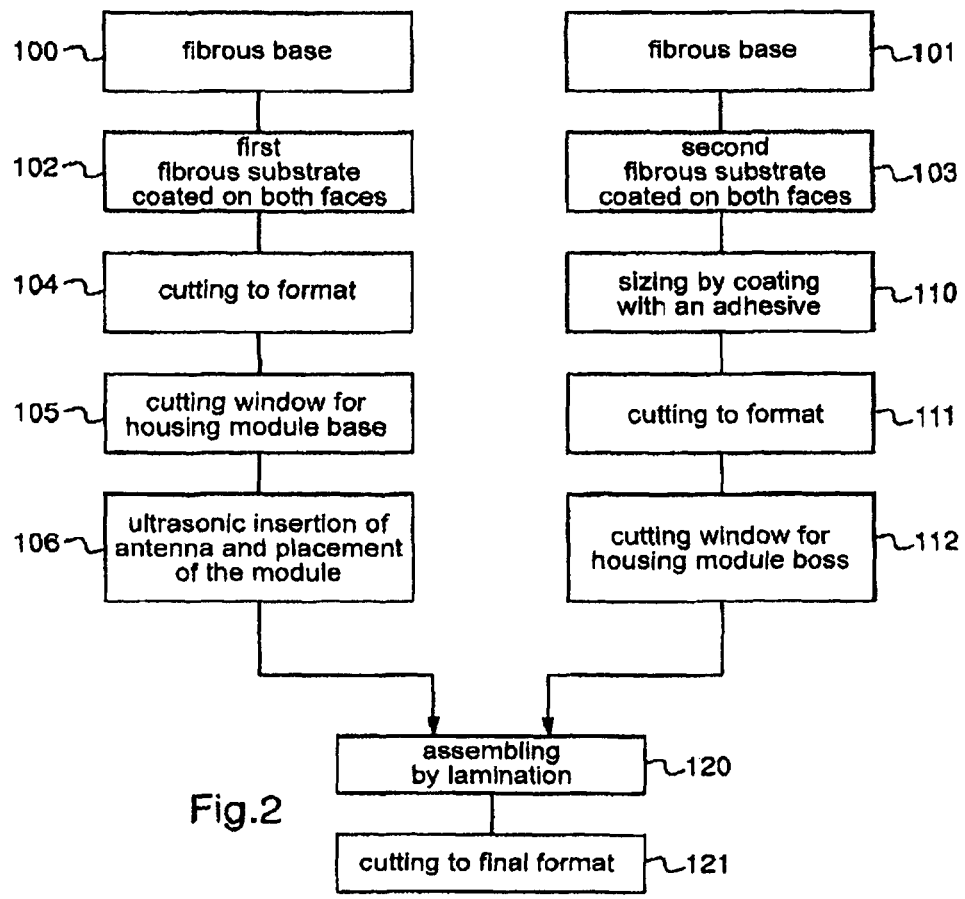
Figure 3:
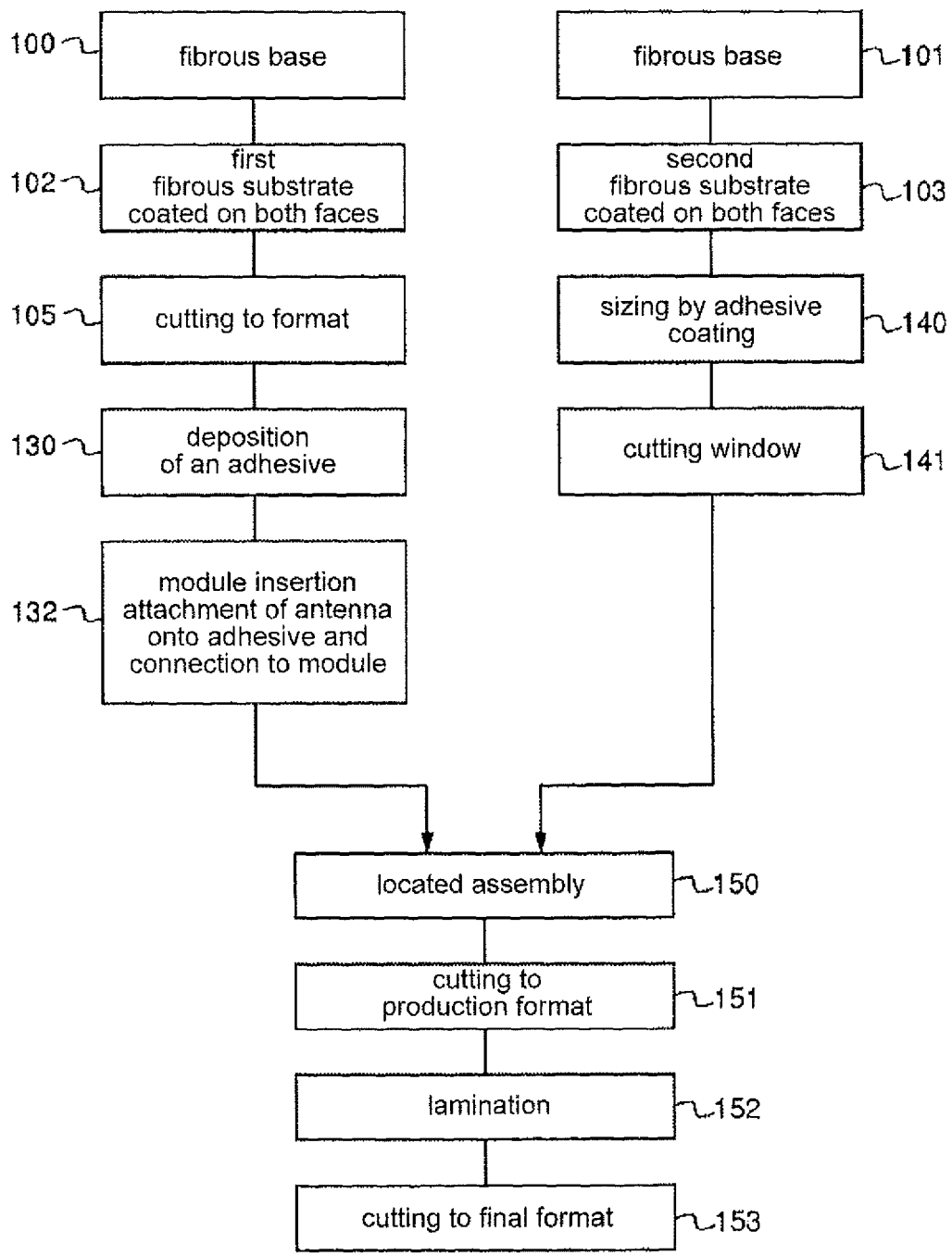

The invention will be better understood upon reading the description which follows, of non-limiting exemplary embodiments thereof and upon examining the appended drawing wherein:

FIG. 1 is a schematic sectional view in the thickness of an exemplary insert made according to the invention, FIGS. 2 and 3 are block diagrams illustrating exemplary embodiments of methods according to the invention.

An insert 1 made according to the invention is illustrated in FIG. 1.

This insert 1 includes a first fibrous substrate 2, an electronic component such as a module 3 for example, a second fibrous substrate 4 and a wire antenna in copper with a skin provided with a heat-sealable varnish.

The module 3 includes in the relevant example a base 7, further called a lead frame, and a boss 8 housing an RFID chip, such a boss being further called potting.

The antenna 5 is electrically connected at its ends to respective contacts located on the base 7, on either side of the boss 8. In a non-illustrated alternative, the antenna is only electromagnetically coupled to the module.

The first and second substrates 2 and 4 are bound by a binding layer 10 including one or more adhesives.

The first substrate 2 includes a recess 11 receiving the base 7 and the second substrate a recess 13 receiving the boss 8. The recesses 11 and 13 are windows of different dimensions in the relevant example.

Exemplary manufacturing methods for the insert 1 will be described with reference to FIGS. 2 and 3.

The method of FIG. 2 includes steps 100 and 101 for making fibrous bases on a reel, in a paper-making machine, and steps 102 and 103 for laying these fibrous bases in order to make the first and second fibrous substrates laid on both faces.

The first fibrous support 2 is cut out to the production format in step 104 and then the window 11 is cut out in step 105 in order to house the base of the module in the thickness of this first substrate.

The antenna 5 is inserted by ultrasound in step 106, with a connection of the module 3 to both ends of the antenna.

The insertion technique by ultrasound allows the antenna wire to penetrate with local melting of the substrate and pressure insertion of the antenna wire into this substrate and its maintaining on the substrate after cooling.

The antenna wires more particularly used in the case of RFID devices operating at 13.56 MHz are for example those sold by Elektrisola. These copper wires generally have an insulating varnish and optionally a heat-sealable varnish as an external skin. This heat-sealable varnish may assume different natures, such as for example a thermoplastic polymer of the polyamide type and, depending on the varnishes used, the conditions for inserting the wire may vary with temperature.

The second fibrous substrate 4 is sized in step 110 by coating with an adhesive, for example a hot reactive adhesive, with optional application of a protective film with low surface energy in order to avoid any blocking during storage and cutting before the lamination step. After sizing, the second fibrous substrate 4 is cut to the production format in step 111 and the window 13 is cut out in step 112 in order to house the boss 8 of the module in the thickness of this second fibrous substrate.

The first and second fibrous substrates are assembled by lamination in step 120, for example by having them pass on a press at 140° C. for 10 min, for example under a pressure of 20 kg/cm$^2$, in order to allow for example cross-linking of the adhesive deposited by coating on the second fibrous substrate.

The assembly may be cut out in step 121 to the final format.

In the method of FIG. 3, after laying the fibrous base of the first flexible substrate 2, the window 11 intended to house the base 7 of the module 3 is cut out and then an adhesive is deposited in step 130 on the face intended to receive the antenna. This adhesive is an adhesive with natural or triggered tackiness, which may be spread or deposited by printing or transfer, at least in the location where the antenna will be deposited on the first flexible substrate.

Step 132 corresponds to the insertion of the module 3 in the window 11 and to the attachment of the antenna on the adhesive deposited in step 130, the module 3 being connected to the antenna.

The second fibrous substrate 4 in step 140 undergoes sizing by coating with an adhesive which for example is a hot reactive adhesive, with application of an optional release layer.

Next, in step 141, the window 13 is cut out and in step 150, the first and second fibrous substrates are assembled in a localized way, in order to position the windows 11 and 13 facing each other, and then the assembly may be cut out in step 151 before being laminated in a step 152 by having it pass on a press, for example at 140° C. for 10 min, in order to allow cross-linking of the adhesive of the second fibrous substrate and optionally cross-linking of the latter deposited on the first fibrous substrate. In step 153, the whole is cut out to the final format.

Examples for forming the constituents of the insert will now be described.

PROPOSED EXAMPLES

The fibrous substrates made in Examples 1-6 are particularly well suitable for making an insert according to the invention, as the one illustrated in FIG. 1 for example.

The inserts of Examples 1 and 2 may be made according to the method of FIG. 2 and those of Examples 3-6 according to the method of FIG. 3.

Example 1

The first flexible substrate 2 is made on the paper-making machine so that the substrate comprises a fibrous base consisting of about 21% by dry mass, relatively to the finished paper, of polyamide synthetic fibers of about 4 mm long and with a diameter of about 1.7 dtex, and of about 56% of cellulose fibers. The cellulose fibers consist of 75% in number of short fibers (from hardwood) and 25% in number of long fibers (from softwood).

The substrate also comprises about 13% by weight relatively to the finished paper of at least one mineral filler, introduced either upon refining, or later on in a mixer. The mineral filler is for example kaolin.

The fibrous base after sheet formation is surfaced on the paper-making machine by a size press system. The size press bath contains a binder, for example polyvinyl alcohol, in an amount of 4% by dry weight relatively to the bath, a softener, for example glycerin, in an amount of 15% by dry weight relatively to the bath, and pigments for example kaolin in an amount of 4% by dry weight relatively to the bath, i.e. a final dry extract of 23%

During the size press impregnation, the paper is impregnated with about 40 g/m$^2$ of humid bath, i.e. a dry regain of about 9 g/m$^2$ by dry weight.

The fibrous base is then coated on both of its faces by means of an air-knife coater, with a coating sauce comprising 30 parts of coating binder of the acrylic styrene type and 100 parts of a mixture of pigments based on calcium carbonate, alumina hydrate and sodium silicate.

The coating deposit on the substrate is of the order of 10+/−2 g/m$^2$ by dry weight per face, for example.

This coated substrate provides good resistance to tear by the presence of 4 mm synthetic fibers. It also provides some flexibility because of the presence of synthetic fibers, bulk and surface fillers, and glycerin.

Finally, because of the presence of the surface layer comprising at least one thermoplastic binder, it provides good insertability for an antenna by ultrasound as well as, because of the presence of so-called absorbent fillers such as alumina silicate and hydrate, an absorption capacity and a surface energy favorable to subsequent lamination.

The second substrate is made on a paper-making machine and on a coater with a composition of the same kind but with a different thickness and therefore a different base weight.

The second substrate is coated with a hot reactive adhesive, for example based on reactive polyurethane, which will provide after assembly with the first substrate and hot lamination all the expected properties notably of tamper resistance in order to prevent any removal of the RFID device by a fraudster with view to using it in another document.

The thereby produced insert provides good resistance to tampering attempts under dry, hot conditions and in solvents, has good flexibility and sufficient cohesion in order to prevent any spontaneous delamination. Moreover, this insert has surface properties suitable for adhesive bonding with a cold vinyl or acrylic glue as used presently for the integration between the cover and the flyleaf of a passport booklet.

Example 2

The insert is made with flexible substrates of the same formulation as in Example 1, except for the absence of bulk fillers and a change in the size press bath which contains a coating binder, for example PVA in an amount of 4% by dry weight relatively to the bath, a softener, for example glycerin in an amount of 15% by dry weight relatively to the bath and a surface adhesive product with an acrylic base in an amount of 4% by commercial weight relatively to the bath.

The flexibility of the obtained insert is a little smaller than in the previous example because of the absence of fillers but the resistance to tampering by peeling as well as the cohesion of the insert are improved because the internal cohesion of each of the flexible substrates is higher.

Example 3

The insert is made with flexible substrates on the same formulation as in Example 1, with the exception of the size press bath which is replaced by an impregnator bath only comprising a flexible latex as a binder, for example an acrylic styrene latex with $T_g$ equal to 4° C., which both imparts flexibility and cohesion to the substrate.

An adhesive is applied on the first flexible substrate by a spraying system equipped with a nozzle.

This adhesive, used for securing the antenna and the first fibrous substrate, is for example an adhesive based on urethane acrylate having in the wet condition sufficient tackiness for holding the antenna. This adhesive may also comprise a cross-linking agent of the isocyanate type in order to allow cross-linking of the adhesive during the subsequent hot lamination operation.

The second substrate is coated with a hot reactive adhesive, for example based on acrylate copolymer, which is compatible with the adhesive of the first substrate with which it will be facing the antenna.

The insert after assembling and lamination has all the expected properties, notably tamper resistance, in order to prevent any removal of the RFID device by a fraudster with view to using it in another document. It also has very high internal cohesion while having great flexibility.

Moreover, this insert, by the presence of filled layers at the surface of the substrate, provides surface properties suitable for adhesive bonding with a cold vinyl or acrylic glue as presently used for the integration between the cover and the flyleaf of a passport booklet.

Example 4

The insert is produced with first and second flexible substrates of the same formulation as in Example 3, except for the size press bath which comprises urea nitrate as a softener in addition to the flexible latex as a binder of the fibrous base, whence even more flexibility.

Example 5

The insert is produced with first and second substrates of the same formulation as in Example 3, but the binder of the fibrous base is introduced by precipitation of the binder particles in situ onto the fibers, during the formation of the sheet, in order to impart flexibility to the substrate.

The binder particles are for example anionically charged latex particles which precipitate by ionic interactions onto the fibers bearing cationic charges.

As the cellulose fibers are anionically charged, additives such as polyamideamine epichlorhydrine may be attached beforehand onto the fibers in order to change their charge.

Latex particles with low $T_g$, below $-10°$ C., provide flexibility to the material while not generating any fouling problem in the impregnator.

If the latex level introduced into the fibrous base is sufficiently high, for example at least 20% by mass in the fibrous base, surfacing of the substrate may be achieved with other surface binders, for example PVA, and this binder will not tend to stiffen the substrate.

Example 6

The first flexible substrate is made on the paper-making machine so that the substrate comprises a fibrous mixture with 100% cellulose fibers.

The substrate also comprises about 20% by weight, relatively to the finished paper, of at least one mineral filler, either introduced upon refining, or later on in a mixer. The mineral filler is for example kaolin.

The fibrous mixture after sheet formation is impregnated in the core on the paper-making machine by an impregnator system.

The impregnator bath contains a binder, for example a synthetic latex of the acrylic styrene type with $T_g$ close to 4° C., in an amount of 15% by dry weight relatively to the bath, a softener, for example a mixture of urea and nitrate, in respective amounts of 10% and 5% by dry weight relatively to the bath, i.e. or a final dry extract of 23%.

During the impregnation in the impregnator, the paper is impregnated with about 70 g/m² of wet bath, i.e. a dry gain of about 21 g/m².

The fibrous substrate is then coated on both of its faces by means of an air knife coater, with a coating sauce comprising 30 parts of binder of the acrylic styrene type and 100 parts of a mixture of pigments based on sodium silicate. The layer deposit on the substrate is of the order of 10+/-2 g/m² by dry weight per face.

The adhesive intended for maintaining the antenna on the first substrate is applied as beads on the first substrate, for example by means of a needle system, in the area of the antenna. The adhesive used is for example an epoxy-based adhesive, having sufficient tackiness in order to maintain the antenna for a few seconds before it is covered with the second flexible substrate.

The adhesive is for example an adhesive which cross-links under UV radiation. By means of an optical fiber provided with a light-emitting diode, the adhesive may be subject to UV radiation at the same time or just before the antenna is unrolled on the first flexible substrate, which causes its cross-linking.

The second substrate was coated beforehand with a hot reactive adhesive, for example based on reactive polyurethane comprising a latent cross-linking agent, the adhesive being cross-linkable by heating.

During the hot and pressure lamination of the two flexible substrates in order to sandwich the antenna, the adhesive over the whole surface of the second surface cross-links and creates an assembly having mechanical, chemical and heat resistances.

The invention is not limited to the examples which have just been described.

Particularities of the application of these examples may be combined within alternatives not shown.

The expression "including" should be understood as being synonymous with <<including at least one>>, unless specified otherwise.

The invention claimed is:

1. An assembly comprising:
    a wire antenna including at least one conductive turn,
    a first fibrous substrate on which the antenna extends, this first fibrous substrate including at least one coated paper comprising a fibrous base, formed with an amount of at least 30% by mass of natural fibers in the fibrous base and including synthetic fibers, the antenna being secured to a face of the first fibrous substrate, the at least one coated paper including on this face at least one surface layer comprising at least one mineral filler and coating binder.

2. The assembly according to claim 1, the fibrous base including at least 40% by mass of natural fibers.

3. The assembly according to claim 2, the fibrous base including a less high proportion of long natural fibers than of short fibers when the fibrous base includes synthetic fibers.

4. The assembly according to claim 3, the fibrous base including between 5 and 25% of synthetic fibers.

5. The assembly according to claim 2, the fibrous base including a less high proportion of short natural fibers than long natural fibers.

6. The assembly according to claim 5, the fibrous base including 20% of the natural fibers that are short and 80% of the natural fibers that are long.

7. The assembly according to claim 1, the coating binder including a thermoplastic material.

8. The assembly according to claim 7, the amount of thermoplastic material in the surface layer being less than or equal to 20 g/m² by dry weight.

9. The assembly according to claim 8, the amount of thermoplastic material in the surface layer being less than or equal to 10 g/m² by dry weight.

10. The assembly according to claim 1, the fibrous base of the first fibrous substrate including a binder.

11. The assembly according to claim 10, the binder of the fibrous base being selected from thermoplastic polymers with a $T_g$ of less than or equal to +20° C.

12. The assembly according to claim 10, the binder of the fibrous base being bulk-precipitated.

13. The assembly according to claim 12, the binder of the fibrous base being selected from polymers with a $T_g$ of less than or equal to −10° C.

14. The assembly according to claim 10, the binder of the fibrous base being introduced into the fibrous base by surfacing.

15. The assembly according to claim 14, the binder of the fibrous base being selected from polymers with a $T_g$ of less than or equal to +10° C.

16. The assembly according to claim 12, the binder of the fibrous base being selected from styrene-butadiene copolymers and acrylic polymers.

17. The assembly according to claim 14, the binder of the fibrous base including a natural binder or a synthetic binder.

18. The assembly according to claim 17, the binder of the fibrous base including a natural binder or a synthetic binder with a $T_g$ close to 7° C.

19. The assembly according to claim 1, the fibrous base including a softener.

20. The assembly according to claim 19, the softener being selected from glycerin, urea or urea nitrate.

21. The assembly according to claim 1, the fibrous base including fibers of a polyamide, polyester, polyolefin and/or a mixture of such fibers.

22. The assembly according claim 1, the fibrous base including between 5 and 25% of synthetic fibers by mass in the fibrous base.

23. The assembly according to claim 1, the filler in the surface layer being selected from carbonates, talc, kaolin, alumina hydrate, titanium dioxide, sodium silicate and mixtures thereof.

24. The assembly according to claim 1, the filler being an absorbent filler having an absorption capacity greater than or equal to 30 mL/100 g.

25. The assembly according to claim 1, the first fibrous substrate being free of fillers in the bulk of the fibrous base.

26. The assembly according to claim 1, the amount of filler in the surface layer being less than or equal to 20 g/m² by dry weight.

27. The assembly according to claim 26, the amount of filler in the surface layer being less than or equal to 10 g/m² by dry weight.

28. The assembly according to claim 1, the natural fibers including cellulose fibers.

29. The assembly according to claim 28, the natural fibers being entirely cellulose fibers.

30. The assembly according to claim 1, the antenna wire being coated with a heat-sealable varnish.

31. The assembly according to claim 1, the fibrous base including polyamide fibers.

32. The assembly according to claim 31, the polyamide fibers being the only synthetic fibers of the fibrous base.

33. The assembly according to claim 1, including synthetic fibers, the average length of the synthetic fibers being comprised between 3 and 10 mm, the average length of the synthetic fibers being larger than or equal to 4 mm.

34. The assembly according to claim 1, including synthetic fibers, the average diameter of the synthetic fibers being comprised between 0.9 and 4.2 dtex.

35. The assembly according to claim 34, the average diameter of the synthetic fibers being equal to that of the natural fibers to within ±30%, the average diameter of the synthetic fibers being comprised between 1.2 and 2 dtex.

36. The assembly according to claim 1, the coating binder of the surface layer including a polymer or a copolymer of a styrene-butadiene, acrylic, acrylic styrene or vinylstyrene kind.

37. The assembly according to claim 1, the coating binder of the surface layer including a polymer.

38. The assembly according to claim 36, the coating binder of the surface layer including a polymer of a styrene-butadiene, vinyl- or acryl-styrene kind.

39. The assembly according to claim 1, including an adhesive on the face of the paper receiving the antenna.

40. The assembly according to claim 39, the adhesive having natural tackiness or triggered by UV or EB radiation, after its deposition.

41. The assembly according to claim 40, the tackiness persisting for at least 60 s, after its laying.

42. The assembly according to claim 40, the adhesive being hot cross-linkable.

43. The assembly according to claim 39, the adhesive being UV cross linkable.

44. The assembly according to claim 39, the adhesive including a cross linking agent.

45. The assembly according to claim 39, the adhesive being a urethane acrylate and including a cross-linking agent of the isocyanate type.

46. The assembly according to claim 39, the adhesive being deposited over a full width.

47. The assembly according to claim 39, the adhesive only covering a portion of the face of the first fibrous substrate, on a region extending under the antenna.

48. An insert including:
an assembly as defined in claim 1,
a second fibrous substrate superposed and adhered to the first, the antenna being located between the first fibrous substrate and the second fibrous substrate.

49. The insert according to claim 48, the first and second fibrous substrates including two respective at least partly superposed recesses, and in which an electronic component is positioned.

50. The insert according to claim 49, the electronic component being an RFID module including an integrated circuit chip.

51. The insert according to claim 50, the module having a widened base surmounted with a boss.

52. The insert according to claim 49, the component being electrically connected to both ends of the antenna.

53. The insert according to claim 49, the recesses being through recesses.

54. The insert according to claim 48, the second fibrous substrate being of a composition identical with the first.

55. The insert according to claim 54, the second fibrous substrate being of a basis weight different from the first.

56. The insert according to claim 48, the second fibrous substrate including an activatable adhesive.

57. A method for making an assembly as defined in claim 56, including the step consisting of depositing the antenna wire on the first fibrous substrate.

58. The method according to claim 57, including the step consisting of coating the first fibrous substrate with an adhesive before placing the antenna wire thereon.

59. The method according to claim 57, the attachment of the antenna wire on the first fibrous substrate being carried out by thermocompression or by ultrasound.

60. The method according to claim 58, the adhesive being cross-linkable under UV radiation, the adhesive being subject to UV exposure at the same time or just before unrolling the antenna wire on the first fibrous substrate, the UV source being borne by a tool for depositing the wire.

61. A method for making an insert, including the steps of:
producing an assembly as defined in claim 1, attaching on the assembly a second fibrous substrate, the antenna being located between the first fibrous substrate and the second fibrous substrate.

62. The method according to claim 61, the second fibrous substrate being coated with an adhesive and the first and second fibrous substrates being hot laminated.

63. The method according to claim 62, the second fibrous substrate being coated with a reactive adhesive.

64. The method according to claim 62, the second fibrous substrate being coated with an adhesive including a cross-linking agent.

65. A method for making a security document including the step of assembling an insert as defined in claim 48 with a booklet or at least one film.

66. The method according to claim 65, wherein the step of assembling an insert is with a cold glue or with a hot activatable adhesive.

67. A security document including an insert as defined in claim 48.

68. The assembly according to claim 1, the wire antenna being an unrolled wire antenna.

69. An assembly comprising:
a wire antenna including at least one conductive turn,
a first fibrous substrate on which the antenna extends, this first fibrous substrate including at least one coated paper comprising a fibrous base, formed with an amount of at least 30% by mass of natural fibers in the fibrous base and including synthetic fibers, the antenna being secured to a face of the first fibrous substrate, the at least one coated paper including on this face at least one surface layer comprising at least one mineral filler and coating binder,
the antenna being inserted at least in part in the first fibrous substrate.

* * * * *